(No Model.)

J. MESSAZ.

LAPIDARY'S TOOL.

No. 457,866.

Patented Aug. 18, 1891.

Witnesses:

Inventor:

(No Model.) J. MESSAZ. 3 Sheets—Sheet 3.
LAPIDARY'S TOOL.

No. 457,866. Patented Aug. 18, 1891.

UNITED STATES PATENT OFFICE.

JOHN MESSAZ, OF GENEVA, SWITZERLAND.

LAPIDARY'S TOOL.

SPECIFICATION forming part of Letters Patent No. 457,866, dated August 18, 1891.

Application filed August 14, 1890. Serial No. 362,042. (No model.) Patented in England June 13, 1890, No. 9,193, and in Luxemburg June 25, 1890, No. 1,305.

*To all whom it may concern:*

Be it known that I, JOHN MESSAZ, a citizen of the Swiss Republic, residing at Geneva, Switzerland, have invented certain Improvements in Lapidaries' Tools and the Like, (for which a patent has been granted in Luxemburg, No. 1,305, dated June 25, 1890, and in Great Britain, No. 9,193, dated June 13, 1890,) of which the following is a specification.
This invention relates to improvements in lapidaries' tools; and the object of my invention is to provide a tool for use in cutting the facets of diamonds and other precious stones in a lathe, which tool shall be adjustable both vertically and horizontally, whereby the cutting of the facets will be rendered uniform and at regular angles of inclination.

In cutting and polishing diamonds and other hard stones it is absolutely essential that the work shall be under the eye and control of the lapidary, so that he may arrest the movement instantly, otherwise the stone may be irreparably injured. Hence the difficulty in adapting automatic machinery to this work.
Such machines may be employed to some extent for roughing off the cheaper stones, but the risk of loss is very great where valuable stones are cut in this way. My device is in the nature of a tool rather than a machine, and that part thereof requiring the greatest care is operated solely by the hand of the lapidary. The tool is also arranged in such a manner as to enable him to inspect the work carefully as it proceeds.
In order that my invention may be the better understood, I have illustrated it in the accompanying drawings, wherein—

Figure 1:
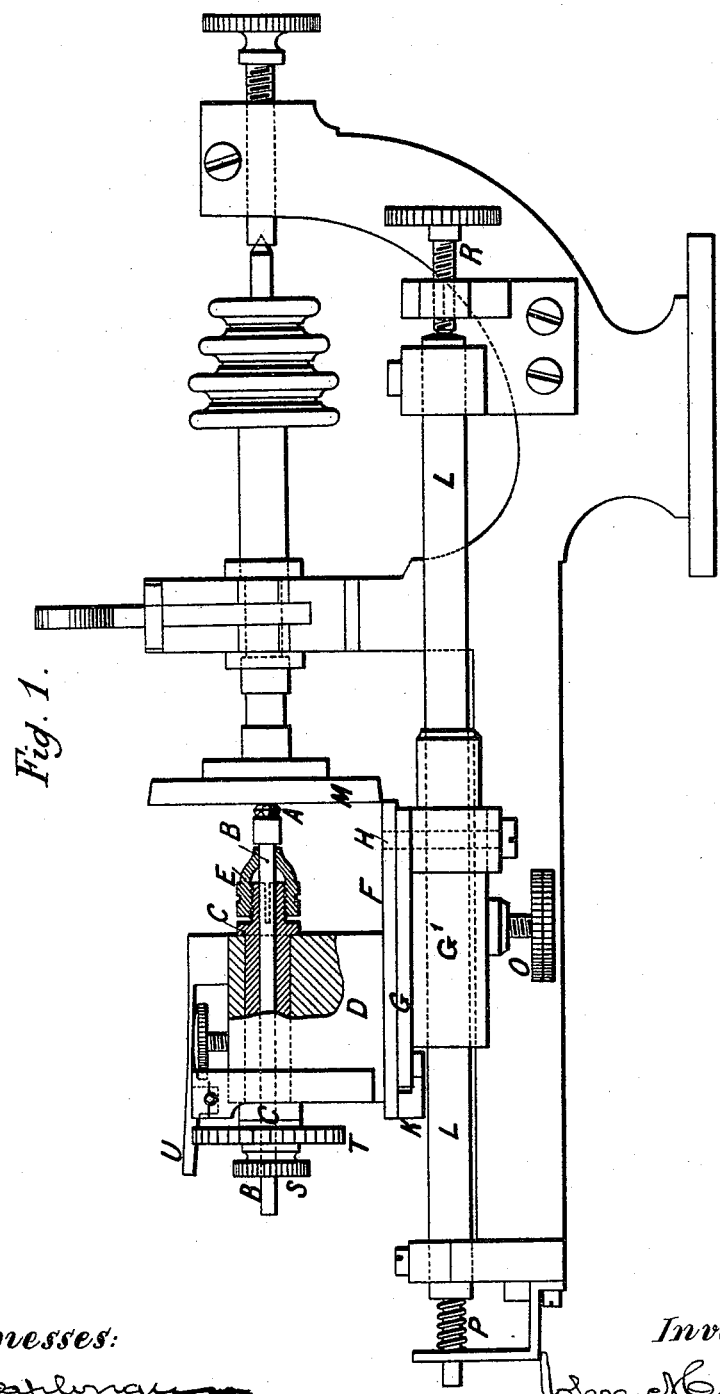
Figure 2:
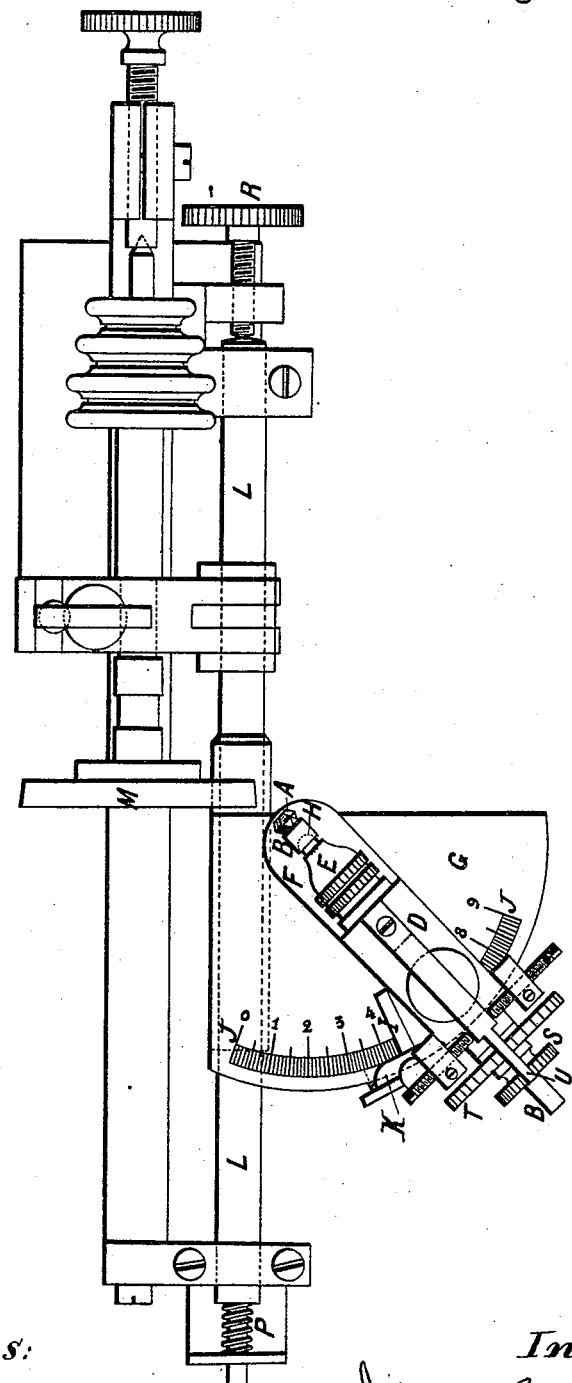
Figure 3:
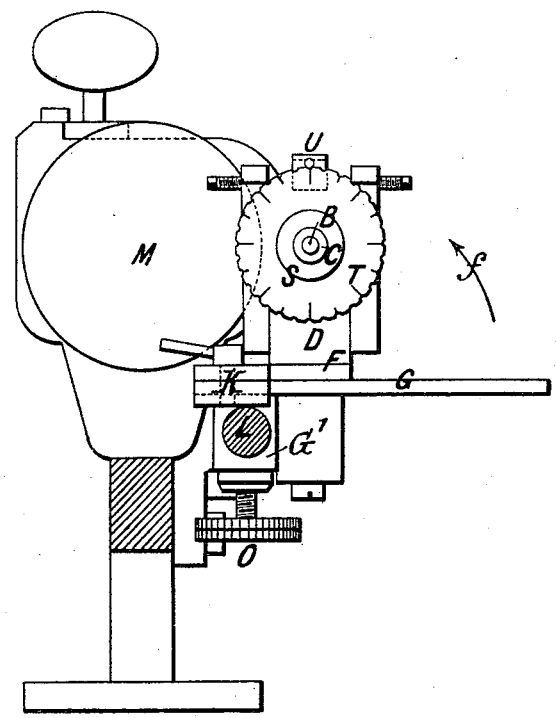

Figure 1 is a front elevation of a lathe provided with my improved tool, and Fig. 2 is a plan view of the same. Fig. 3 is an end elevation of the same, taken in the direction indicated by the arrow *x* in Fig. 1.

In the drawings, A is the stone to be cut, which is fixed or secured in the ordinary manner to the end of a rod B, held firmly in the hollow cylinder C by means of a nut E. The carriage D is fixed to a plate F, pivoted at H to the stationary support G' of the tool, and swinging in an arc from such pivot as a center over the surface of a sector-shaped metal plate G, fixed to the support G', and provided about its curved outer edge with graduations J, over which plays an index I on said carriage D. The carriage D is secured to sector G when properly set by means of a clamp or jaw K, secured to the former and hooking under the latter. The grinding-wheel M is mounted in the ordinary or any way on the spindle or shaft of the lathe, from which spindle it receives its rotary movement. The sector G is secured by screws or other suitable means to the support G', which has at one side a bearing, through which passes a shaft L, extending longitudinally of the lathe-bed or at right angles to the plane of wheel M, on which shaft it is adapted to be turned so as to set the tool at the proper angle to cut the facet. By turning the sector G and its support G', bearing carriage D, in the direction indicated by arrow *f* in Fig. 3, the stone on said carriage is brought into contact with the grinding-wheel M, the sector and carriage turning about shaft L as a center. A set-screw O is provided for setting the sector and carriage at any desired angle on the shaft L, and the pressure of the stone against the wheel M is regulated by a spring P on the end of shaft L, which is compressed between the end of the latter and the bearing for the contracted end of the said shaft. The tension of said spring is regulated by a set-screw R on the opposite end of said shaft.

In order to cut the several facets of the stone at the same angle of inclination, which angle is, of course, previously ascertained, the rod B is turned through the medium of a milled head S on the end of axis C. A graduated dial T on the axis C indicates exactly through the medium of the spring-index U the facet being cut, which index also acts as a stop for the dial T, taking into notches formed in the periphery of the dial at the end of each of the graduation-marks on the face of the latter.

The operation is as follows: The rod, carrying the stone on its end, is first adjusted in its case on the carriage D, which is then adjusted according to the graduations on sector S, so as to bring the stone to the desired angle of inclination, such angle being calculated according to the number of facets to be given to the polyhedron to be cut. The sector is then moved toward the grinding-wheel M, and the tool is oscillated while pressing the stone against the wheel in order to render the wear on the grinding-wheel M more uniform and to prevent the formation of parallel scratches or marks on the facets of the stone. As the stone swings about the shaft L as a center and the wheel M turns about its own center, it follows that the shifting of the stone over the face of the wheel will effectually prevent the formation of parallel scratches which interfere with the polish. When the facet has been worn away to the desired extent, the rod carrying the nipper is turned in its casing to the proper angle, according to the number of facets to be obtained, so as to present a second and fresh face to the wheel, the spring-index U slipping out of the notch in which it lies into the next notch, and the operation is repeated as before described.

I am aware that in automatic machines for grinding or cutting stones a grinding-wheel mounted on a vertical shaft and a stone-carrying shaft adapted to be set with its axis at varying degrees of obliquity with the face of said wheel have been employed; and I am also aware that in such machines the shaft carrying the stone has been mounted in a carriage and an automatic reciprocating motion given to this carriage, whereby the stone being cut is moved radially to and fro over the face of the wheel. In these machines, also, the stone-carrying shaft has imparted to it two automatic movements—namely, an intermittent rotary motion and an intermittent longitudinal reciprocating motion. My tool differs from these machines in that it is simple and inexpensive and non-automatic, the lapidary having complete control of its every movement.

Having thus described my invention I claim—

1. In a lapidary's tool, the combination, with the grinding-wheel rotatively mounted on the lathe-spindle, of the tool-support mounted to swing on an axis parallel to the axis of rotation of the lathe-spindle, the graduated base-plate secured to said tool-support, and the carriage for the dop carrying the stone also secured to said support, said carriage traversing the scale on the base-plate, whereby the angle of inclination of the stone in said carriage with regard to the grinding-wheel is indicated by said scale, substantially as set forth.

2. In a lapidary's tool, the combination, with a horizontally-mounted lathe-spindle and a grinding-wheel M fixed thereon, of the shaft L, rotatively mounted parallel to the lathe-spindle and at the side thereof and provided with screw R and spring P for longitudinal adjustment, the support G', mounted on the shaft L, the graduated sector G, secured to said support, the plate F, pivoted to said support and sector, the carriage D, fixed to plate F and carrying an index I and spring-index U, the cylinder C, mounted rotatively in the carriage D and carrying the notched dial T, which is engaged by the index U, and the rod B, mounted axially in the cylinder C and provided with a holder for the stone to be cut, substantially as set forth.

In witness whereof I have hereunto signed my name in the presence of two subscribing witnesses.

JOHN MESSAZ.

Witnesses:
E. A. FAWS,
GEORGES LEROC.